United States Patent [19]

Womberly

[11] Patent Number: 5,340,135
[45] Date of Patent: Aug. 23, 1994

[54] HAND TRUCK FOR FISHING EQUIPMENT

[76] Inventor: Johnnie V. Womberly, 1704 Carlisle Dr., East, Mobile, Ala. 36618

[21] Appl. No.: 170,733

[22] Filed: Dec. 21, 1993

[51] Int. Cl.$^5$ ................................................ B62B 1/14
[52] U.S. Cl. .............................. 280/47.19; 280/47.24; 280/47.27
[58] Field of Search .................... 280/652, 659, 47.17, 280/47.19, 47.24, 47.27, 47.28

[56] References Cited

U.S. PATENT DOCUMENTS

| | | | |
|---|---|---|---|
| 3,046,035 | 7/1982 | Nichols | 280/47.27 |
| 3,052,484 | 9/1962 | Huffman et al. | 280/36 |
| 3,927,898 | 12/1975 | Wegrauch | 280/47.27 |
| 4,072,319 | 2/1978 | Berger | 280/654 |
| 4,355,818 | 10/1982 | Watts | 280/47.19 |
| 4,452,468 | 6/1984 | Eads | 280/641 |
| 4,749,209 | 6/1988 | Edmonds | 280/652 |
| 4,865,346 | 9/1989 | Carlile | 280/654 |
| 5,026,089 | 6/1991 | Grimmonpre | 280/655 |
| 5,159,777 | 11/1992 | Gonzalez | 280/47.26 |
| 5,197,754 | 3/1993 | Ward | 280/655 |
| 5,203,815 | 4/1993 | Miller | 280/47.26 |

Primary Examiner—Richard M. Camby
Attorney, Agent, or Firm—Richard C. Litman

[57] ABSTRACT

A hand truck for fishing equipment includes various modifications providing for the removable carriage of a variety of equipment and tackle associated with the sport of fishing. The hand truck includes one or more tubes attached to the side(s) of the frame side member(s), providing for the insertion of the butt(s) or handle(s) of fishing rod(s) therein, thus keeping the center of the truck clear and precluding obstructing the user of the truck with any fishing rod(s) carried thereon. The central portion of the truck includes a hook providing support of the handle of a bait bucket or the like therefrom. The lower platform or shelf of the truck provides for the carriage of an ice chest or cooler and a tackle box thereon. Laterally disposed tiedowns are secured to the truck frame for securing such large articles to the truck. The truck provides not only for the transport of such equipment, but may also serve as a seat with back rest when the user reaches his/her desired fishing site, by removing the tackle box from the truck and using the ice chest as a seat and the truck frame as a back support.

7 Claims, 2 Drawing Sheets

HAND TRUCK FOR FISHING EQUIPMENT

FIELD OF THE INVENTION

The present invention relates generally to manually operated hand trucks, carts, and the like, and more specifically to a hand truck having special modifications thereto providing for use with specialized equipment and tackle as used in fishing. The hand truck may be used for the carriage and transport of other articles when not being used for the carriage and transport of fishing tackle and equipment.

BACKGROUND OF THE INVENTION

Fishing is an extremely popular pastime with many individuals, particularly retirees. As the hobby has developed, anglers have found that specialized rods, reels, lures, etc. are beneficial in attracting and bringing in specific types of fish under specific conditions, which has led to the typical serious angler transporting a relatively large amount of fishing tackle and equipment about when he/she travels to a fishing site. Add to that a bucket or container for live bait and other comforts particularly valued by senior citizens who have the time to devote to extensive pursuit of the hobby (ice chests or coolers, tackle boxes, possibly an umbrella for protection from the sun, auxiliary lighting equipment for use after sunset or before dawn, etc.), and one can see that hand carriage of such an assortment of paraphernalia can be difficult at best, even if for only a short distance from car to boat or other fishing site.

The need arises for a hand truck, cart or the like, which is equipped to carry all of the above equipment in order to enable an angler to transport such equipment easily and without undue difficulty. The hand truck should be capable of carrying a relatively large load, and must have specialized fittings for the carriage and storage of fishing rods and the like, as well as a post(s) or fitting(s) for the support of a handled container, e.g., bait bucket or the like.

DESCRIPTION OF THE PRIOR ART

U.S. Pat. No. 3,052,484 issued to Levi D. Huffman et al. on Sep. 4, 1962 discloses Utility Carts With Multiple Pivoted Load Supports. The primary feature of the device is its folding nature; the wire frame of the lower support and baskets are incapable of supporting a substantial load. Moreover, the device fails to provide the specialized support required for specialized fishing tackle and equipment.

U.S. Pat. No. 4,072,319 issued to Henry D. Berger on Feb. 7, 1978 discloses a Hand Truck With Retractable Frame. The device is intended for relatively light loads due to the wire frame lower support, as in the Huffman et al. truck discussed above. Again, no specialized fittings are provided for the carriage of fishing equipment or the like.

U.S. Pat. No. 4,452,468 issued to Harold O. Eads et al. on Jun. 5, 1984 discloses a Cart With Molded Bag Supporting Structures. The device includes a flat, planar bottom support and a pivotally attached upper support providing peripheral support for the mouth of a flexible bag or container secured thereto. The device is unsuitable for use in the carriage of fishing equipment.

U.S. Pat. No. 4,749,209 issued to Willie L. Edmonds on Jun. 7, 1988 discloses a Collapsible Fishing Gear And Load Bearing Carriage. The device is more akin to a wagon frame, having a tongue and handle extending therefrom for pulling by the user thereof. A relatively tall load disposed upon the angularly arrayed main frame members would preclude the use of the essentially centrally located tubes for the storage of fishing rods or the like. The fishing rod storage tubes of the present invention are disposed to the sides of the frame, where they are not blocked by loads carried across the frame.

U.S. Pat. No. 4,865,346 issued to Ed Carlile on Sep. 12, 1989 discloses a Collapsible Cart Assembly including a specialized container removably installable to the upper portion of the frame. No means for the carriage of fishing tackle or poles is disclosed.

U.S. Pat. No. 5,026,089 issued to Gerald D. Grimmonpre on Jun. 25, 1991 discloses a Luggage Securing Strap For Use With Collapsible Luggage Carrier. The strap is secured about the load in a plane defined by the vertical and longitudinal axes of the cart, rather than laterally across the articles carried on the cart. Thus, no means providing for the attachment of the strap to the side frame portions of the cart is provided.

U.S. Pat. No. 5,197,754 issued to Lyla B. Ward on Mar. 30, 1993 discloses a Collapsible Beach Cart including a "box-shaped" foldable container secured to the frame. No means for the carriage of fishing poles is disclosed, and the carriage of larger articles on the front shelf or support thereof is precluded by the permanently installed foldable container secured in that position.

Finally, U.S. Pat. No. 5,203,815 issued to Richard A. Miller on Apr. 20, 1993 discloses Apparatus For Carrying Fishing Equipment. Generally tubular elements for the storage of fishing rods or the like therein are disclosed, but they are disposed across the back portions of laterally extending shelves, between the frame side members. Thus, a person using the cart in its normally rearwardly angled position in order to preclude forward overbalancing of the load, would have the fishing rods angled rearwardly into the user's face. Moreover, the only time the fishing rod holders are available for storage of rods therein, is when the shelves are folded outward. While the shelves provide for storage of articles thereon, if a larger article is to be carried on only the bottom shelf, with the top shelf folded, the upper fishing rod support tubes are also folded with the upper shelf, precluding carriage of any fishing rods therein. The present invention provides for carriage of the fishing rods to the sides of the frame, thereby providing a clear view and manipulation of the cart or truck, and further providing for carriage of such rods regardless of the load carried on the platform or shelf.

None of the above noted patents, taken either singly or in combination, are seen to disclose the specific arrangement of concepts disclosed by the present invention.

SUMMARY OF THE INVENTION

By the present invention, an improved hand truck for fishing equipment is disclosed.

Accordingly, one of the objects of the present invention is to provide an improved hand truck for fishing equipment which includes specialized attachments thereto providing for the carriage of fishing rods, bait buckets and the like thereon.

Another of the objects of the present invention is to provide an improved hand truck for fishing equipment which includes plural tubes disposed to each side of the frame side members of the truck and providing for the carriage of fishing rods therein, thereby maintaining clearance of the central portion of the truck for the user thereof.

Yet another of the objects of the present invention is to provide an improved hand truck for fishing equipment which includes a centrally disposed hook thereon for the support of the handle of a bait bucket or the like.

Still another of the objects of the present invention is to provide an improved hand truck for fishing equipment which includes tiedown attachments disposed along each frame side member and providing for the securing of straps laterally across any load carried upon the truck platform or shelf.

A further object of the present invention is to provide an improved hand truck for fishing equipment which includes such equipment as one or more fishing rods, at least one tackle box, a bait bucket, and at least one ice chest or cooler removably secured thereto.

A final object of the present invention is to provide an improved hand truck for fishing equipment for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
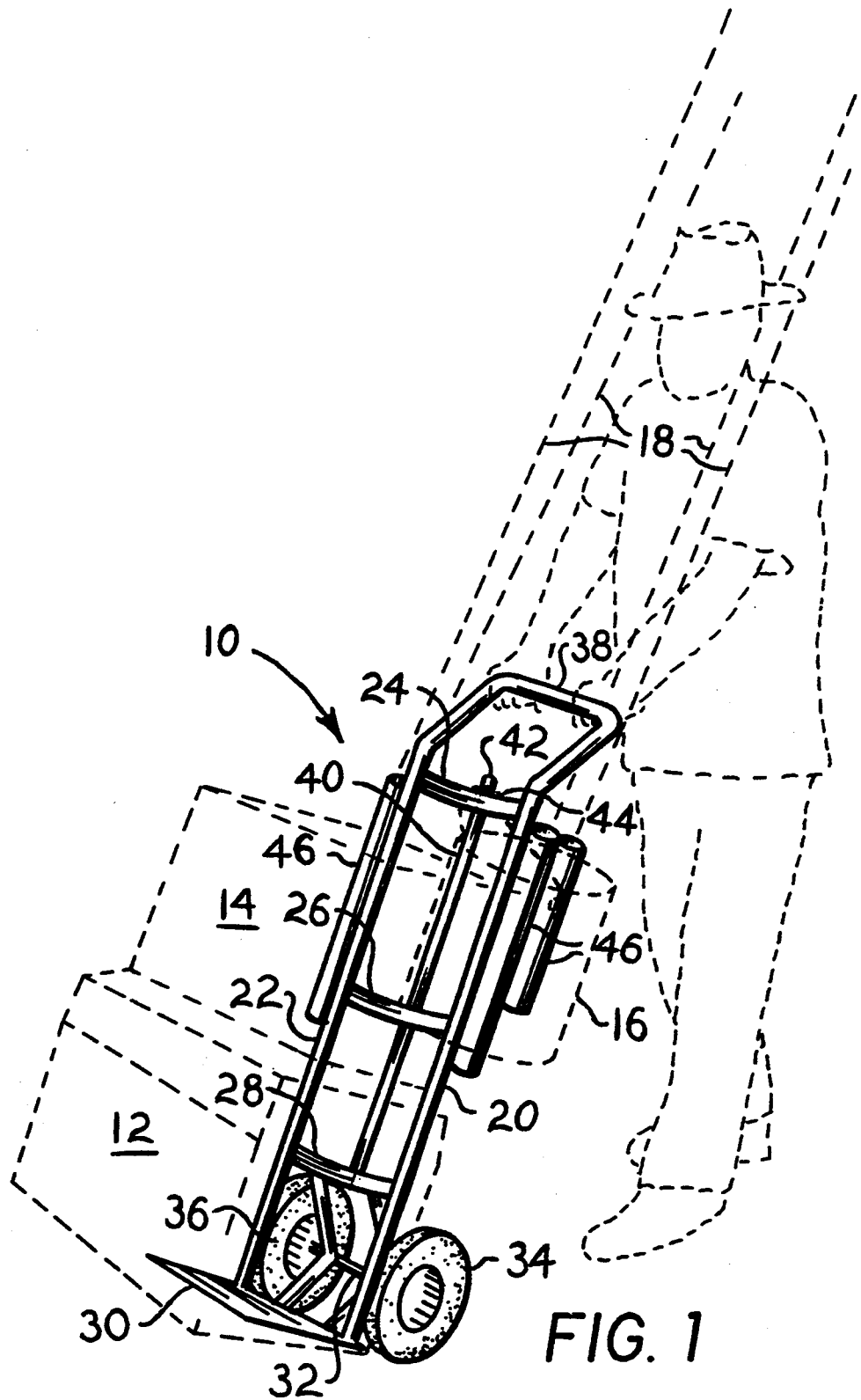
FIG. 1 is a perspective view of the hand truck of the present invention, showing its use in the carriage of an extensive amount of equipment and the various means thereon providing for the securing of such equipment to the truck.

Referring now to the drawings, the present invention will be seen to relate to a hand truck 10 for the carriage and transport of fishing equipment thereon. FIG. 1 shows the general configuration of the hand truck 10 and various articles of fishing equipment contained thereon, including an ice chest or cooler 12, a tackle box 14, a bait bucket 16, and fishing rods 18 or the like. Hand truck 10 basically comprises a frame having laterally spaced apart left and right upright members 20 and 22, first, second and third lateral crossmembers 24 through 28, a load support platform 30 extending from the lower ends of the uprights 20 and 22, and is supported by an axle 32 with left and right wheels 34 and 36.

In addition to the above basic structure of the hand truck 10, a handle 38 is formed between the upper ends of the two uprights 20 and 22, and a central upright 40 connects the three lateral crossmembers 24 through 28 between the left and right uprights 20 and 22. The central upright 40 includes an extension or hook 42 on its upper end which extends upward above the first lateral crossmember 24, thus serving as a hook or catch for the handle 44 of a container, such as the bait bucket 16 shown in FIG. 1, to be suspended or supported therefrom.

One or more tubes 46 are secured to the outboard sides of the left and right uprights 20 and/or 22, in order to support and carry one or more fishing rod handles or butts therein. It will be seen that the fishing rod holding tube(s) 46 are disposed with their elongate axes parallel to the uprights 20 and 22, in order that any rods 10 carried therein will extend generally upwardly so as to provide forward, rearward and lateral clearance about the hand truck 10. The disposal of the tube(s) 46 to the outboard sides of the left and right lateral frame members 20 and 22 also provides a clear view for the user of the truck 10, and precludes the rod(s) 18 striking the user as the truck 10 is tilted rearwardly in order to balance the load thereon for transport.

Figure 2:
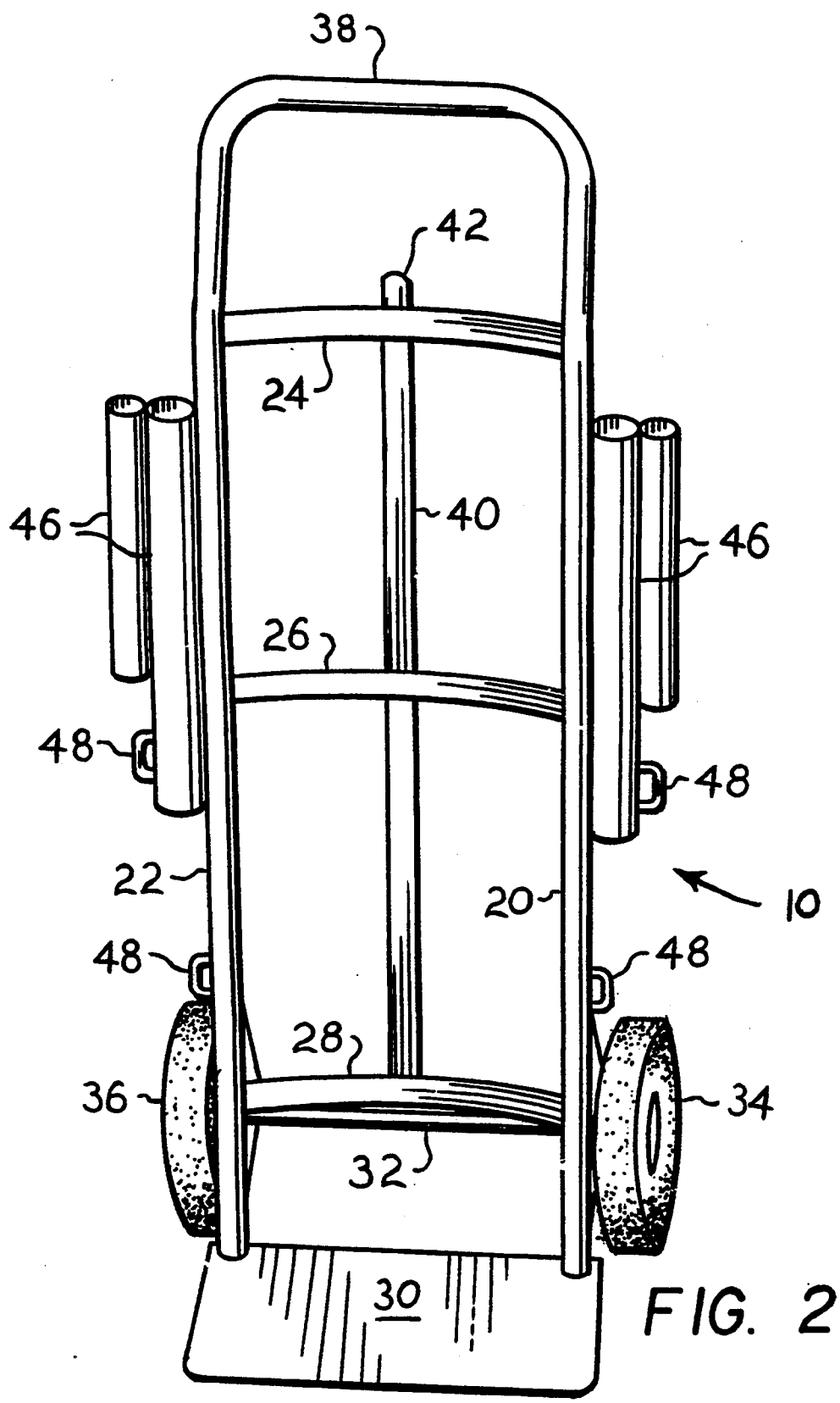
FIG. 2 is a front view of the hand truck, showing its various details.

In addition to the above, left and right lateral tiedowns 48 (FIG. 2) are provided respectively on the left and right lateral frame members 20 and 22, and/or on the left and right fishing rod tubes 46, to provide for the securing of any load (e.g., an ice chest or cooler 12 and/or a tackle box 14) thereto, by means of straps or the like (not shown).

The hand truck 10 of the present invention is particularly useful for the carriage of fishing equipment and the like from the home or storage area to a car or other transportation, and from the car to the fishing site on dock or shore. The associated equipment, e.g., ice chest or cooler 12, tackle box 14, bait bucket 16, and fishing rod(s) 18 may be placed upon and/or secured to the truck 10 as described above, and the truck 10 manually maneuvered to transport the above equipment as desired. When the fishing site is reached, the tackle box 14, bait container 16, and fishing rod(s) 18 may be removed from the truck 10 and placed where they are readily available. The truck 10 may be positioned as desired with the cooler 12 remaining secured thereto, for use as a seat for the angler. The upright arrangement of the uprights 20, 22, and 40 provide a back rest for the angler while seated upon the cooler 12 secured to the truck 10; additional back padding for the uprights and seat padding for the cooler 16 (not shown) may be used for greater comfort, if desired. When food, drink or other articles contained in the cooler are desired, the user may merely stand and lift the lid for access thereto, replacing the lid to provide seating once again. When the days fishing is completed, the tackle box 14, bait container 16, and fishing rod(s) 18 may be replaced upon the truck 10 and transported as needed for return and storage until the next fishing trip.

It will be seen that the present invention can be used in more conventional ways also, for the carriage of articles such as firewood, building materials, and various other articles as required, by merely removing the equipment 12 through 18 and using the truck 10 conventionally. Thus, the present invention provides great versatility in addition to its specialized use in fishing.

It is to be understood that the present invention is not limited to the sole embodiment described above, but encompasses any and all embodiments within the scope of the following claims.

I claim:

1. A hand truck for the carriage of fishing equipment, comprising:

a frame formed of a laterally spaced apart elongate left, central and right upright frame member, with each said left, central and right upright frame member secured together by a spaced apart first, second and third lateral crossmember;

said left and said right upright frame member each having an upper end and a lower end, with said lower ends of said left and said right upright frame member having a load support platform extending therefrom and therebetween, and said upper ends of said left and said right upright frame member having a truck handle extending therebetween;

said hand truck further including an axle disposed behind said upright frame members and adjacent said left and said right frame member lower ends, with said axle having a spaced apart left and right wheel thereon, said central upright frame member including an upper end with a hook extending therefrom, said hook being disposed above said first lateral crossmember to provide support for fishing equipment suspended therefrom;

said left and said right upright frame member each including at least one elongate fishing rod support tube attached thereto, with each said elongate fishing rod support tube being parallel to said left and said right elongate upright frame member, whereby;

fishing equipment is secured to said hand truck by means of said load support platform, said upright frame members, said hook, and each said fishing rod support tube, and said hand truck is manually transported to a fishing site where the fishing equipment is unloaded from said hand truck as required for fishing.

2. The hand truck of claim 1 wherein:

each said left and said right upright frame member includes an outboard side and said at least one fishing rod support tube attached to each said left and said right upright frame member comprises two said tubes disposed respectively to each said left and said right upright frame member outboard side.

3. The hand truck of claim 1 including:

at least one lateral tiedown extending outwardly from each said left and said right upright frame member and each said at least one fishing rod support tube.

4. Fishing equipment and a hand truck providing for the carriage thereof, comprising in combination:

a plurality of articles of fishing equipment, and;

a hand truck for the carriage of said fishing equipment, said hand truck comprising a frame formed of a laterally spaced apart elongate left, central and right upright frame member, with each said left, central and right upright frame member secured together by a spaced apart first, second and third lateral crossmember, said central upright frame member of said hand truck including an upper end with a hook extending therefrom, said hook being disposed above said first lateral crossmember to provide support for fishing equipment suspended therefrom;

said left and said right upright frame member of said hand truck each having an upper end and a lower end, with said lower ends of said left and said right upright frame member having a load support platform extending therefrom and therebetween, and said upper ends of said left and said right upright frame member having a truck handle extending therebetween;

said hand truck further including an axle disposed behind said upright frame members and adjacent said left and said right frame member lower ends, with said axle having a spaced apart left and right wheel thereon, and;

said hand truck left and right upright frame member each including at least one elongate fishing rod support tube attached thereto, with each said elongate fishing rod support tube being parallel to each said elongate upright frame member, whereby;

said fishing equipment is secured to said hand truck by means of said load support platform, said upright frame members, said hook, and each said fishing rod support tube, and said hand truck is manually transported to a fishing site where said fishing equipment is unloaded from said hand truck as required for fishing.

5. The fishing equipment and hand truck combination of claim 4, wherein:

said plurality of articles of fishing equipment include at least one ice chest removably secured to said hand truck load support platform, at least one tackle box removably secured to said frame of said hand truck, at least one bait bucket container supported from said hook of said hand truck, and at least one fishing rod supported from said at least one fishing rod support tube.

6. The fishing equipment and hand truck combination of claim 4 wherein:

each said left and said right upright frame member of said hand truck includes an outboard side and said at least one fishing rod support tube attached to each said left and said right upright frame member comprises two said tubes disposed respectively to each said left and said right upright frame member outboard side.

7. Fishing equipment and a hand truck providing for the carriage thereof, comprising in combination:

a plurality of articles of fishing equipment, and;

a hand truck for the carriage of said fishing equipment, said hand truck comprising a frame formed of a laterally spaced apart elongate left, central and right upright frame member, with each said left, central and right upright frame member secured together by a spaced apart first, second and third lateral crossmember;

said left and said right upright frame member of said hand truck each having an upper end and a lower end, with said lower ends of said left and said right upright frame member having a load support platform extending therefrom and therebetween, and said upper ends of said left and said right upright frame member having a truck handle extending therebetween;

said hand truck further including an axle disposed behind said upright frame members and adjacent said left and said right frame member lower ends, with said axle having a spaced apart left and right wheel thereon, and a hook extending from said frame and providing for the support of at least one of said articles of fishing equipment suspended therefrom, and;

said hand truck left and right upright frame member each including at least one elongate fishing rod support tube attached thereto, with each said elongate fishing rod support tube being parallel to each said elongate upright frame member, whereby;

said fishing equipment is secured to said hand truck by means of said load support platform, said upright frame members, said hook, and each said fishing rod support tube, and said hand truck is manually transported to a fishing site where said fishing equipment is unloaded from said hand truck as required for fishing; and, said hand truck includes at least one lateral tiedown extending outwardly from each said left and said right upright frame member and each said at least one fishing rod support tube.

* * * * *